Oct. 16, 1945. B. GREENWALD 2,386,791
CHUCK AND HOSE PROTECTOR
Filed Sept. 27, 1944
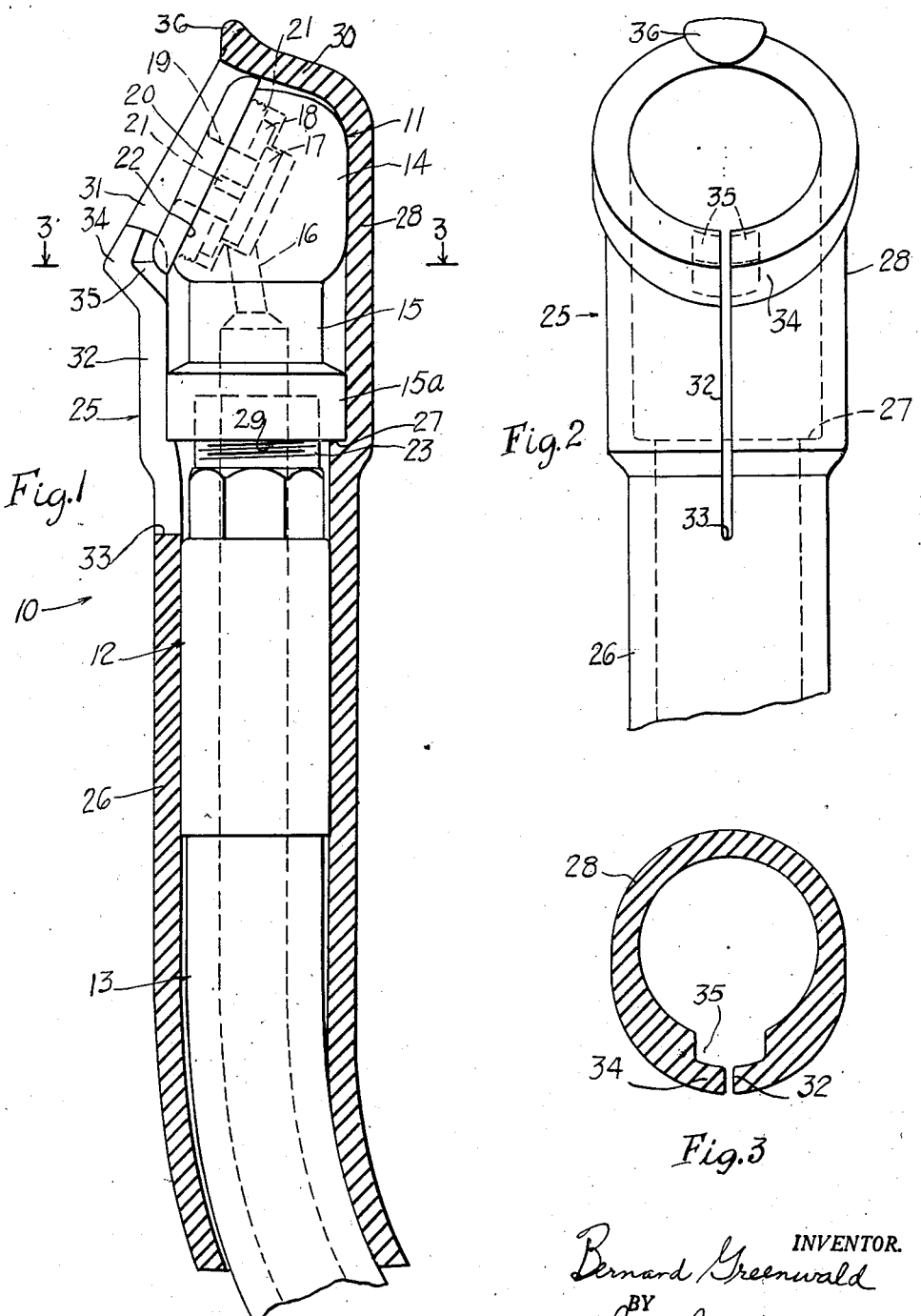
INVENTOR.
Bernard Greenwald
BY
Louis Shumacher, Atty.

Patented Oct. 16, 1945

2,386,791

UNITED STATES PATENT OFFICE 2,386,791

CHUCK AND HOSE PROTECTOR

Bernard Greenwald, New York, N. Y.

Application September 27, 1944, Serial No. 556,069

4 Claims. (Cl. 138—61)

This invention relates to protective devices for so-called chuck and hose units.

In the case of an air pressure dispenser for automobile tires, the same is conventionally provided with a long, flexible hose at the end of which is a metallic sleeve to which is connected an automatic check valve adapted to be opened by the pin of the air valve of the automobile tire. In practise this hose is thrown around and often its valve or so-called chuck is flung against the sidewalk or other concrete objects, so that the valve becomes gradually worn down and eventually breaks, and the tightness of its parts and the alinement of its valve are often so disturbed that permanent leakage of air results. More particularly, the impacts on the valve casing may cause a screw threaded part to loosen slightly, then succeeding impacts cause deformation at the thread and in the loosened part so that when the operator eventually discovers the leakage of air and tightens the part, proper seating and engagement to avoid leakage of air is no longer possible. Repeated recurrence of this process aggravates the leakage, so that the desired pressures are not obtainable and loss of power results.

It is therefore an object of the invention to provide a device which avoids these difficulties and which is quick and easy to apply and which will not interfere with the normal use of the device in supplying air to a tire.

Another difficulty consisted in the wearing and fraying of the rubber hose at its connection with the tubular shank or handle for the valve. In course of being thrown around the hose would become abraded and would eventually leak or break at this area. The special connections generally employed would render it impossible to cut off the worn part of the hose and again connect the latter directly to the shank except by special tools and in accordance with a process suitable only for factory use.

It is therefore another object of the invention to provide an improved one-piece device adapted to protect the hose as well as the valve.

Another object is to furnish such a device which is easy and cheap to manufacture and convenient to apply.

A further object of the invention is the provision of a device comprising a valve and holder or hose unit and a one-piece elastic protector unit therefor, which units cooperate with each other in an improved manner so that the elastic unit is securely locked on the valve unit and is nevertheless easily applied to and removed therefrom.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is an enlarged vertical side view showing a device embodying the invention, with the protector unit in section and the valve, handle and hose unit in elevation.

Fig. 2 is a fragmentary view in front elevation of the protector unit.

Fig. 3 is a section on the line 3—3 of Fig. 1.

The advantages of the invention as here outlined are best realized when all of its features and instrumentalities are combined, but, useful embodiments may be produced involving less than the whole.

It will be obvious to those skilled in the art to which the invention appertains, that the same may be incorporated in several different constructions. The accompanying drawing, therefore, is submitted merely as showing a preferred exemplification of the invention.

Referring in detail to the drawing, 10 denotes a device embodying the invention. The same includes a unit comprising a check valve 11, a tubular shank or holder 12 therefor, and a flexible hose 13 connected to the shank. The hose is connected to a high pressure pump, so that the unit referred to constitutes a conventional means for supplying air to an automobile tire. By way of further clarification, the valve 11 includes a casing 14 having a downward extending tubular part 15 terminating in an internally threaded enlargement 15a. For controlling the flow of air through the passage 16, a disc valve 17 is actuated by air pressure to normally engage the rubber seat 18 and thus close the outlet opening 19 formed in a cap 20. Formed on the valve 17 is a central pin 21 which is adapted to abut a pin on a tire air valve to cause opening of the latter as well as of the valve 17 so that air pressure may flow into the tire. The cap 20 carries the seat 18 and has an externally threaded portion 21 for engaging an internal thread of the casing 14, and upon removal of the cap, the valve 17 may be removed for inspection and replacement. The cap 20 may be considered a lateral extension of the casing 14, and the opening 19 is a lateral outlet at an acute angle to the axis of the casing for convenience in applying the valve or chuck 11 to the valve of a tire. It will be noted that if the threaded part 21 of the cap 20 should become loosened, air will leak out, and the valve 17 may improperly seat on the seating portion 18. The cap 20 is made quite heavy in construction, but nevertheless the repeated impacts to which it is subjected by careless throwing about of the hose causes the cap to loosen and then to become deformed so that it cannot be screwed tightly and cannot seat properly on the valve casing at the plane 22. The rigid shank 12 is connected to the hose 13 by a special means (not shown) which makes it very difficult or impossible for the average garage owner to cut away and replace a portion of the hose which usually wears out rapidly within four or five inches of the shank. The latter is provided with a threaded part 23 which is engaged in the enlargement 15a of the valve casing 14. The structure thus far described is conventional and is in almost universal use in garages and gasoline stations in this country, and hence it is considered that a more detailed showing thereof is unnecessary.

The invention includes a protector unit 25 consisting of rubber and being elastic throughout. The said unit is of one-piece tubular structure sleeved over the valve, shank and an adjacent portion of the hose. Said unit may be considered to comprise one section engaged over the valve and a part of the shank and another section engaged over the hose and another part of the shank. The unit or member 25 is wholly open at its lower end and is of uniform diameter at 26 along the hose and shank at the upper end of which the member is formed with an internal seat or shoulder 27 of annular shape, produced by enlarging the member 25 at 28 to enclose the valve 11. The bottom annular portion 29 of the enlargement 15a of the valve casing forms a seat engageable with the shoulder 27. At its upper end the member 25 is provided with an end wall 30 adapted to overlie the top of the valve 11, the end wall and the shoulder 27 confronting each other. Laterally formed in the section 28 of the member 25 is an opening 31 registering with the opening 19 and somewhat smaller in size than the cap 20. This opening lies in a plane almost parallel to the outer face of the cap 20 but preferably downwardly diverging therefrom, and the top wall 30 terminates substantially at the opening 31. The wall of the section 28 projects beyond the plane of the cap 20 as shown to afford a bumper or cushioning protector therefor. From the lower edge of the opening 31, a slot 32 extends downward below the shoulder 27 and terminating at 33 a distance below the seat 27 as hereinafter explained. At the intersection of the opening 31 with the slot 32, a projection or bulge portion 34 is provided, and the cross section of the member 25 may be externally elliptical for this purpose. This portion 34 is formed hollow or with an internal undercut or chamber 35 confronting the adjacent part of the cap 20, the slot 32 intersecting the hollow 35. At the upper edge of the opening 31 the top wall 30 may be formed with a projection 36 extending above the wall and forwardly of the plane of the opening 31.

In operation, the member 25 protects the valve 11 against impacts when a careless operator flings the hose 13 to a side. The rubber absorbs the impacts all around, including at the ring member 20 of the valve, since the section 28 projects frontward beyond the outside face of ring. The use of the valve or chuck 11 against the air valve of a tire is not in any way obstructed, because the valve and its pin 21 are freely engaged in the usual manner. The hose portion adjacent to the handle or shank 12 is protected from sharp bending or twisting strains, and from abrasion or other wear. Thus the life of the chuck and hose is greatly increased.

To apply the member 25 to a chuck and hose, the valve 11 is first removed by unscrewing it at the threaded portion 23 of the shank. Then the hose and shank are inserted into the protector 25 from the lower end thereof until the shank projects outward through the opening 31 of the protector. Now the valve 11 is screwed onto the nipple 23 and the valve is forced downward into the protector through the opening 31. In so doing, the protector is expanded at the slot 32, as with the aid of a screw driver or any other simple tool, if necessary. The assembly is thus complete.

The structure of the device 10 is such that the head and shank cannot be accidentally withdrawn from the protector 25, because the shoulder 29 of the valve casing seats on the internal shoulder 27 of the protector. At the same time the protector cannot slide down and expose the valve, because the top wall 30 seats on and restrains the valve. Thus the confronting top wall and shoulder provide a securement which is retained by the elasticity of the protector, and the shank 12 need not tightly fit in the latter but may be easily inserted into and removed therefrom. It will be understood that the rubber wall of the protector is sufficiently rugged so that it has a strong tendency to prevent expansion at the slot 32, this in turn aiding in retaining the rugged top wall 30 down on the valve.

The bulge portion 34 is undercut at 35 to afford a high degree of cushioning to thus avoid expansion at the slot 32 by an impact. It also serves as a reenforcement to prevent opening up at the slot. The projection 36 is located where the impacts are most frequent and where the force of an impact will tend to force the top wall 30 downward into strong frictional contact with the valve so that the adjacent parts of the top wall may not be pushed rearward and expose the valve to an impact.

For removal and replacement of the valve element 17, the valve 11 is forced upward and out of the opening 31 with the slot 32 expanding and the top wall 30 flexing rearward, while the section 26 also flexes to thus afford sufficient room for this operation. Now the valve 11 may be unscrewed if necessary or the ring member 20 alone may be unscrewed. As previously pointed out, accidental loosening of the ring member and deformation of it and its thread at 21 with consequent leakage due to improper seating on the valve casing are avoided as well as resultant misalinement with the valve 17.

I claim:

1. A device including a laterally opening valve chuck for feeding air into a pneumatic tire, which chuck comprises a rigid, removable shank to which an air hose is adapted to be connected and a hollow rubber one-piece member having a first section embracing the shank and extending at least to one end thereof, said member being elastic and having a second section extending beyond the other end of the shank to receive the adjacent part of the chuck, the second section having a lateral opening for the outlet of the chuck, the second section having an end wall overlying the end of the chuck adjacent to said lateral opening, and the second section having a single, narrow slot communicating with the lateral opening at an underside of the chuck and extending down to the said first section, the wall of the second section being elastic for expansion thereof at the slot and said wall having sufficient stiffness to retain the second section securely around the chuck except when expansion is required for movement of the chuck past said end wall.

2. A device according to claim 1 wherein the second section comprises an outwardly projecting undercut portion at the intersection of the slot with the lateral opening, said undercut portion being spaced laterally from the chuck.

3. A device according to claim 1 wherein the chuck includes a shoulder at the point of removable engagement of the shank, the second section having a seat for the shoulder confronting said end wall and lying nearer the end wall than the closed end of the slot.

4. A device according to claim 1 wherein the member is provided with an element at the upper edge of the lateral opening, said element projecting forward of the plane of the opening and upward above the top wall so that pressure on the element causes the top wall to frictionally engage the chuck.

BERNARD GREENWALD.